United States Patent
Sanders et al.

(10) Patent No.: US 11,838,972 B2
(45) Date of Patent: *Dec. 5, 2023

(54) SYSTEMS AND METHODS FOR OPTIMIZING DUAL CONNECTIVITY NETWORK ENVIRONMENTS

(71) Applicant: Verizon Patent and Licensing Inc., Basking Ridge, NJ (US)

(72) Inventors: Susan Wu Sanders, Bridgewater, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/550,039

(22) Filed: Dec. 14, 2021

(65) Prior Publication Data

US 2022/0104297 A1    Mar. 31, 2022

Related U.S. Application Data

(63) Continuation of application No. 16/786,494, filed on Feb. 10, 2020, now Pat. No. 11,234,283.

(51) Int. Cl.
| | |
|---|---|
| *H04W 76/15* | (2018.01) |
| *H04W 80/02* | (2009.01) |
| *H04W 76/27* | (2018.01) |
| *H04W 84/20* | (2009.01) |

(52) U.S. Cl.
CPC .......... *H04W 76/15* (2018.02); *H04W 76/27* (2018.02); *H04W 80/02* (2013.01); *H04W 84/20* (2013.01)

(58) Field of Classification Search
CPC ..... H04W 76/15; H04W 76/27; H04W 80/02; H04W 84/20; H04W 36/0069; H04W 40/36

See application file for complete search history.

(56) References Cited

U.S. PATENT DOCUMENTS

| | | | |
|---|---|---|---|
| 2018/0213589 A1* | 7/2018 | Wu | H04W 76/20 |
| 2019/0254100 A1* | 8/2019 | Yu | H04W 76/18 |
| 2020/0029389 A1* | 1/2020 | Yilmaz | H04W 8/08 |
| 2020/0229036 A1* | 7/2020 | Tang | H04W 28/0252 |
| 2020/0305216 A1* | 9/2020 | Kim | H04W 76/19 |
| 2021/0195439 A1* | 6/2021 | Prabhakar | H04W 24/02 |
| 2022/0159773 A1* | 5/2022 | Ingale | H04W 36/0069 |
| 2023/0007553 A1* | 1/2023 | Rugeland | H04W 36/0058 |

\* cited by examiner

*Primary Examiner* — Will W Lin

(57) ABSTRACT

Systems and methods provide for configuring, by a first wireless station using radio resource control (RRC), a plurality of Fifth Generation (5G) wireless stations associated with 5G secondary cell groups (SCGs), wherein the first wireless station is associated with a first anchor cell for the SCGs; determining, by the wireless station, that a dual connectivity (DC) user equipment (UE) device has a wireless connection to a first 5G wireless station via a first 5G cell, wherein a second 5G SCG is associated with a second one of the 5G wireless stations and the DC-UE device is located in an area associated with the first anchor cell and in an area associated with a second anchor cell; and switching, using a media access control (MAC) control element (CE) of the DC-UE device, the wireless connection from the first 5G cell to the second 5G cell.

20 Claims, 6 Drawing Sheets

SYSTEMS AND METHODS FOR OPTIMIZING DUAL CONNECTIVITY NETWORK ENVIRONMENTS

RELATED APPLICATION

The patent application is a continuation of U.S. patent application Ser. No. 16/786,494 filed on Feb. 10, 2020, titled "SYSTEMS AND METHODS FOR OPTIMIZING DUAL CONNECTIVITY NETWORK ENVIRONMENTS," the disclosure of which is hereby incorporated by reference herein in its entirety.

BACKGROUND INFORMATION

Fifth Generation (5G) New Radio (NR) technology provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like. User devices associated with a 5G NR system may have the capability to communicate via a mmWave spectrum band over a 5G NR network, as well as communicate via a sub-6 GHz ("sub-6") frequency range over other networks, such as a Long Term Evolution (LTE) based network. For example, an Evolved Universal Terrestrial Radio Access New Radio Dual Connectivity (EN-DC) device has the capability to exchange signaling and data with an LTE base station (e.g., an eNode B (eNB)), as well as exchange signaling and data with a 5G NR base station (e.g., a gNode B (gNB)).

Because radio frequency (RF) propagation characteristics (e.g., scattering, shadowing, attenuation, diffraction, etc.) differ between the sub-6 and mmWave spectrum bands, the RF air interface for each is impacted differently for radio conditions in a given coverage area. For example, mmWave RF is more susceptible to obstructions (e.g., signage, vegetation, vehicles, etc.) than sub-6 RF, such that mmWave connectivity and service degradation may occur despite the use of beam switching or other service quality enhancement technology.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing 5G service for a multi-radio dual connectivity (MR-DC) (e.g., EN-DC, NR-DC, etc.) device in an efficient manner. For example, in one implementation, an EN-DC device may communicate with one or more base stations to allow the EN-DC device to connect to an "anchor cell" associated with, for example, an LTE radio access network (RAN). In some implementations, an NR-DC device may communicate with one or more base stations to allow the NR-DC device to connect to an anchor cell associated with, for example, a 5G sub-6 frequency band RAN. The term "anchor cell," as used herein (also referred to herein as LTE anchor cell, EN-DC anchor cell, EN-DC cell, or master cell group (MCG)), refers to a cell or channel associated with a wireless station (or master node) that supports communications via both a non-5G network (e.g., an LTE network) and a 5G network using, for example, a non-stand-alone (NSA) EN-DC service. For example, the anchor cell may communicate in accordance with LTE requirements and be configured to communicate in accordance with 5G requirements. The anchor cell may initiate a handover to a 5G base station (a secondary or serving node) when the user device is located within an area (e.g., cell) supporting 5G communications, for example, a secondary cell group (SCG) (or serving cell) associated with the MCG. The EN-DC device may form a connection with the anchor cell, and then connect with a 5G cell to allow the EN-DC device to communicate via 5G. In this manner, once the EN-DC device moves into an area where 5G coverage is available, the EN-DC device may be transitioned from an LTE base station (e.g., eNB) to a base station (e.g., gNB) supporting 5G communications.

Systems and methods described herein are also transparent to user devices operating in accordance with LTE and 5G NR protocols/standards. That is, no additional features or functionality are needed for EN-DC devices to access 5G services offered by a service provider. In addition, systems and methods described herein provide for connecting a user device (e.g., an EN-DC device) to a 5G network regardless of whether the user device is in an idle state or a connected state. Still further, implementations described herein minimize signaling (e.g., radio resource control (RRC) messages) between the user device and the wireless stations, thereby reducing network traffic and eliminating signaling problems, such as a signaling storm, in either an MCG network or SCG network when transitioning a communication session from one SCG to another SCG anchored by the same or different MCG.

Figure 1:
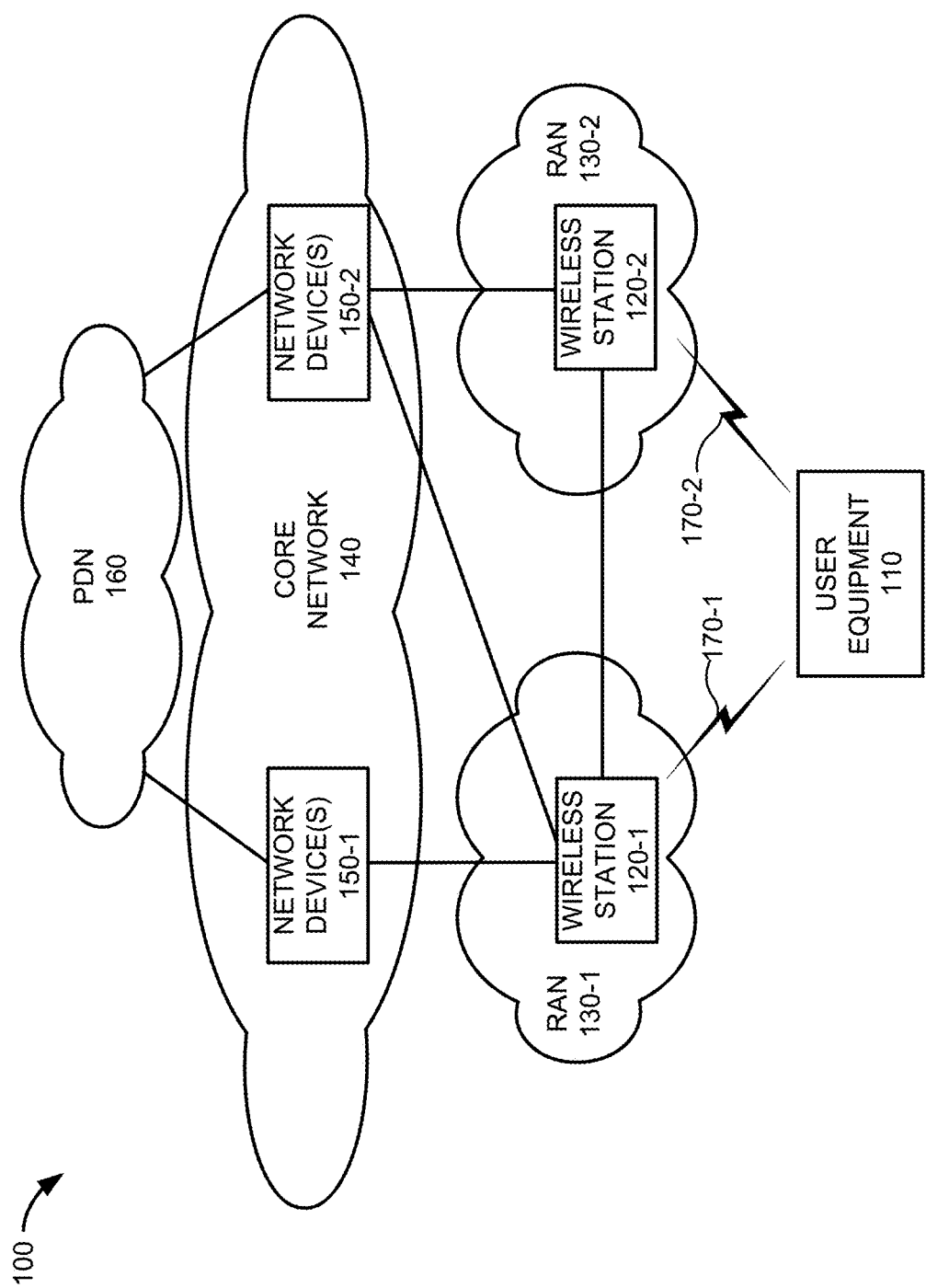
FIG. 1 illustrates an exemplary environment in which systems and methods described herein may be implemented.

FIG. 1 is a diagram of an exemplary environment 100 in which the systems and methods described herein may be implemented. Referring to FIG. 1, environment 100 includes user equipment (UE) 110, wireless station 120-1 associated with radio access network (RAN) 130-1, wireless station 120-2 associated with RAN 130-2, core network 140 with network devices 150-1 and 150-2, and packet data network (PDN) 160. Wireless stations 120-1 and 120-2 may be referred to herein collectively as wireless stations 120 and individually as wireless station 120 or 120-X, RANs 130-1 and 130-2 may be referred to herein collectively as RANs 130 and individually as RAN 130 or 130-X. Network devices 150-1 and 150-2 may be referred to herein collectively as network devices 150 and individually as network device 150 or 150-X. In other embodiments, environment 100 may include additional networks, fewer networks, and/or different types of networks than those illustrated and described herein.

Environment 100 includes links between the networks and between the devices. For example, environment 100 may include wired, optical, and/or wireless links among the devices and the networks illustrated. A communicative connection via a link may be direct and/or indirect. For example, an indirect communicative connection may involve an intermediary device and/or an intermediary network not illustrated in FIG. 1. Additionally, the number and the arrangement of links illustrated in environment 100 are exemplary.

In the configuration illustrated in FIG. 1, UE 110 may use wireless channels 170-1 and 170-2 (referred to collectively as wireless channels 170) to access wireless stations 120-1 and 120-2, respectively. Wireless channels 170 may correspond, for example, to a physical layer in accordance with different radio access technology (RAT) types. For example, wireless channel 170-1 may correspond to the physical layer associated with 4G or 4.5G RAN standards (e.g., 3GPP standards for 4G and 4.5G air interfaces, collectively referred to herein as "4G"), while wireless channel 170-2 may correspond to the physical layer associated with 5G NR standards (e.g., 3GPP standards for 5G air interfaces).

UE 110 (also referred to herein as UE device 110 or user device 110), may include any type of mobile device having multiple coverage mode capabilities (e.g., EN-DC capabilities) and is able to communicate with different wireless stations (e.g., wireless stations 120) using different wireless channels (e.g., channels 170) corresponding to different RANs (e.g., RANs 130-1 and 130-2). UE 110 may be a mobile device that may include, for example, a cellular radiotelephone, a smart phone, a tablet, any type of interne protocol (IP) communications device, a Voice over Internet Protocol (VoIP) device, a personal computer (PC), a laptop computer, a notebook, a netbook, a wearable computer (e.g., a wrist watch, headgear, eye glasses, etc.), a gaming device, a navigation device, a media playing device, a digital camera that includes communication capabilities (e.g., wireless communication mechanisms such as Wi-Fi), etc. In other implementations, UE 110 may be implemented as a machine-type communications (MTC) device, an Internet of Things (IoT) device, a machine-to-machine (M2M) device, etc.

UE 110 may connect to RANs 130 and other devices in environment 100 via any conventional technique, such as wired, wireless, optical connections or a combination of these techniques. UE 110 and the person associated with UE 110 (e.g., the party holding or using UE 110) may be referred to collectively as UE 110 in the description below.

According to implementations described herein, UE 110 may be provisioned (e.g., via a subscriber identity module (SIM) card or another secure element) to recognize particular network identifiers (e.g., associated with RANs 130) and to support particular radio frequency (RF) spectrum ranges (e.g., 4G frequencies, sub-6, mmWave, etc.).

Wireless stations 120 may each include a network device that has computational and wireless communication capabilities. Wireless stations 120 may each include a transceiver system that connects UE device 110 to other components of RAN 130 and core network 140 using wireless/wired interfaces. Wireless stations 120 may be implemented as a base station (BS), a base transceiver station (BTS), a Node B, an evolved Node B (eNode B), an evolved LTE (eLTE) eNB, a next generation Node B (gNode B), a remote radio head (RRH), an RRH and a baseband unit (BBU), a BBU, or other type of wireless node (e.g., a picocell node, a femtocell node, a microcell node, etc.) that provides wireless access to one of RANs 130. Each wireless station 120 may support a RAN 130 having different RAT types. For example, in one implementation, RAN 130-1 may include an E-UTRAN for an LTE network, while RAN 130-2 may include a 5G NR RAN as well as an E-UTRAN for an LTE network. For example, RAN 130-2 may be configured to support communications via both LTE and 5G networks.

Core network 140 may include one or multiple networks of one or multiple types. For example, core network 140 may be implemented to include a terrestrial network and/or a satellite network. According to an exemplary implementation, core network 140 includes a network pertaining to multiple RANs 130. For example, core network 140 may include the core part of an LTE network, an LTE-Advanced network, a 5G network, a legacy network, etc.

Depending on the implementation, core network 140 may include various network elements that may be implemented in network devices 150. Such network elements may include a mobility management entity (MME), a user plane function (UPF), a session management function (SMF), a core access and mobility management function (AMF), a unified data management (UDM), a PDN gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140. In some implementations, wireless station 120-1 and wireless station 120-2 may directly interface with some network devices 150-2 (e.g., SGW) for data plane communications and wireless station 120-1 may directly interface with some network devices 150-1 (e.g., MME) for control plane communications.

PDN 160 may include one or more networks, such as a local area network (LAN), a wide area network (WAN), a metropolitan area network (MAN), a telephone network, the Internet, etc., capable of communicating with UE 110. In one implementation, PDN 160 includes a network that provides data services (e.g., via packets or any other Internet protocol (IP) datagrams) to UE 110.

The number and arrangement of devices in environment 100 are exemplary. According to other embodiments, environment 100 may include additional devices (e.g., thousands of UEs 110, hundreds of wireless stations 120, dozens of RANs 130, etc.) and/or differently arranged devices, than those illustrated in FIG. 1.

As described above, in an exemplary implementation, UE 110 is an EN-DC device capable of communicating via a 4G network (e.g., an LTE network) or 4.5G network, as well as via a 5G network. In provisioned systems based on current standards, UE 110 may connect to a cell based on the signal strengths of the particular base stations. However, criteria other than signal strength may be used for selecting among available cells.

Figure 2:
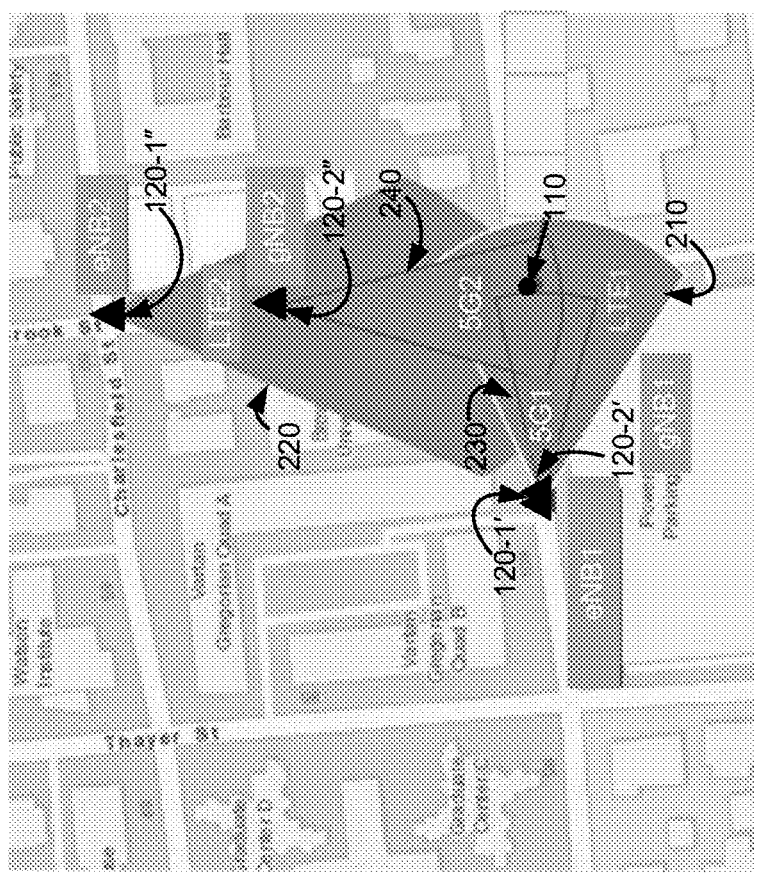
FIG. 2 illustrates exemplary cell coverage areas in a portion of the environment of FIG. 1.

FIG. 2 illustrates an exemplary portion of environment 100 associated with one or more RANs 130 that include cells that operate in the same or different spectrum bands. Referring to FIG. 2, environment 100 includes cells 210, 220, 230, and 240.

Each of cells 210-240 may correspond to a particular coverage supported by a deployed wireless station 120. In an exemplary implementation, LTE1 cell 210 and LTE2 cell 220 may each correspond to LTE-based cells having a relatively large coverage area supporting LTE communications devices that operate in a particular spectrum band, such as a sub-6 RF band. In other exemplary implementations, cell 220 and/or cell 230 may be NR cells 220 and 230 operating in the sub-6 frequency band. In an exemplary implementation, cell 230 and cell 240 correspond to 5G NR cells that have a smaller coverage area than cell 210 and cell 220 and operate in a different spectrum band than cell 210 and cell 220, such as mmWave RF band.

In this example, assume that cell 210 corresponds to an MCG or anchor cell that is serviced by base station 120-1' (e.g., eNB1) and enabled to communicate in accordance with LTE protocols/standards. Assume also that cell 220 is serviced by base station 120-1" (e.g., eNB2) and enabled to communicate in accordance with LTE protocols/standards. Further assume that cell 230 and cell 240 correspond to SCGs respectively serviced by base station 120-2' and base station 120-2", are enabled to communicate in accordance with 5G protocols/standards, and are anchored by cell 210. In some implementations, base station 120-1' and 120-2' may be substantially collocated. In other implementations, 120-1' and 120-2' may be deployed in different locations. Assume that UE 110 has mobility (e.g., can be carried or transported by a user via a sidewalk, a street, etc.) relative to the fixed base stations that allows connection to and/or service from one or more of cells 210-240. As shown, cells 210-240 may have overlapping coverages, for example, such that there is an area(s) covered by multiple (e.g., all) of cells 210-240.

In this example, multiple SCGs (e.g., cell 230, cell 240) are configured via RRC protocol signaling (or other layer 3 signaling) to be anchored by a single MCG (e.g., cell 210) at the same time and, in one implementation, only one of the SCGs is actively connected to UE 110 at a time. In one implementation, UE 110 may be configured to perform fast switching from one SCG (e.g., cell 230) to another SCG (e.g., 240) anchored by the MCG (e.g., cell 210), using, for example, UE 110's media access control (MAC) control element (CE) signaling. The fast switching may provide continuous 5G connectivity to UE 110. For example, radio conditions at a current location of UE 110 (indicated in FIG. 2 by a circle pointed to by an arrow), may be affected by a vehicle (e.g., a large truck) that obstructs (e.g., attenuates) RF signals transmitted by gNB1 120-2' from reaching UE 110 in 5G1 cell 230 and thereby degrading signal strength. Upon detecting these radio conditions, and based on some cell selection criteria, a MAC CE of UE 110 may, on-demand and in real-time, switch connectivity to gNB2 120-2", which is also anchored by MCG cell 210. For example, mmWave connectivity/service may be maintained without disruption, by eliminating a transition to sub-6 RF available from MCG anchor cell 210. In this manner, switching between SCGs (5G cells 230 and 240) occurs without RRC (i.e., layer 3) reconfiguration at the time of the switch. In one implementation, MCG cell 210 may initiate a handoff so that cell 220 becomes the MCG anchor for SCGs cells 230 and 240.

Figure 3:
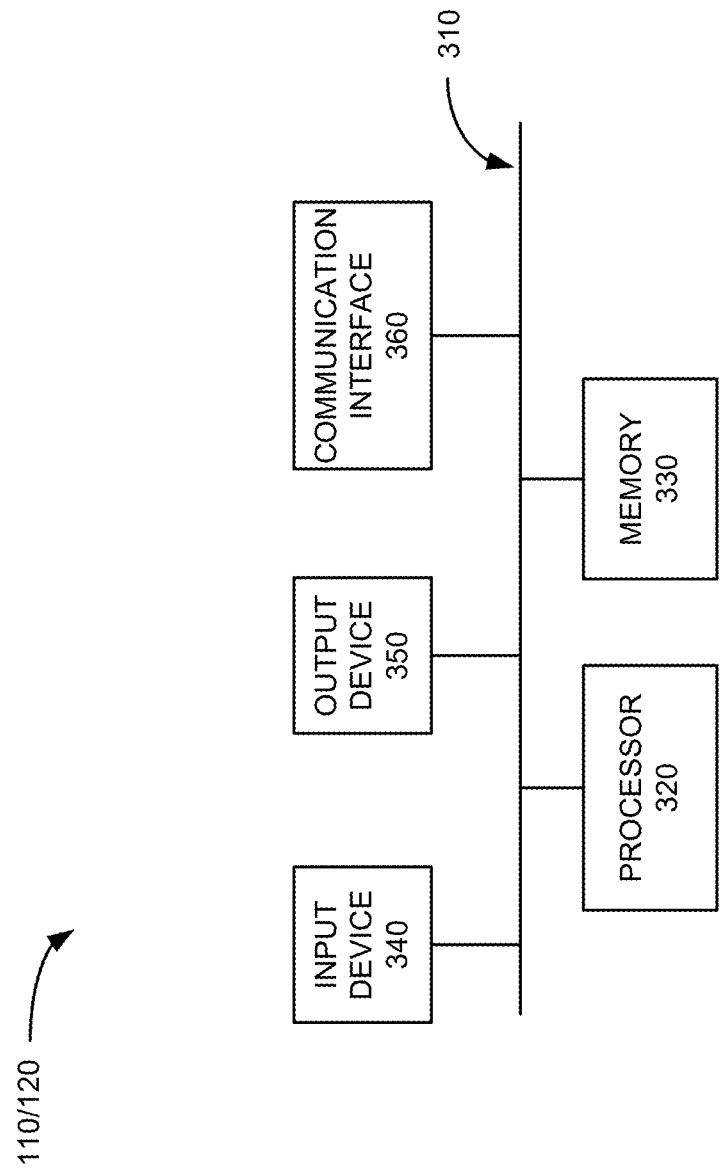
FIG. 3 illustrates an exemplary configuration of logic components included in one or more of the devices of FIG. 1.

FIG. 3 illustrates an exemplary configuration of UE 110. Other devices in environment 100, such as wireless stations 120, network devices 150 and elements in PDN 160 may be configured in a similar manner. Referring to FIG. 3, UE 110 may include bus 310, processor 320, memory 330, input device 340, output device 350 and communication interface 360. Bus 310 may include a path that permits communication among the elements of UE 110.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to UE 110, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that UE 110 (or wireless station 120) uses to communicate with other devices via wired, wireless or optical mechanisms. For example, communication interface 360 may include one or more radio frequency (RF) transmitters, receivers and/or transceivers and one or more antennas for transmitting and receiving RF data via links 170. Communication interface 360 may also include a modem or an Ethernet interface to a LAN or other mechanisms for communicating with elements in a network, such as RAN 130 or another network.

The exemplary configuration illustrated in FIG. 3 is provided for simplicity. It should be understood that UE 110 (or wireless station 120) may include more or fewer devices than illustrated in FIG. 3. In an exemplary implementation, UE 110 (or wireless station 120) perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), solid-state drive (SSD), etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
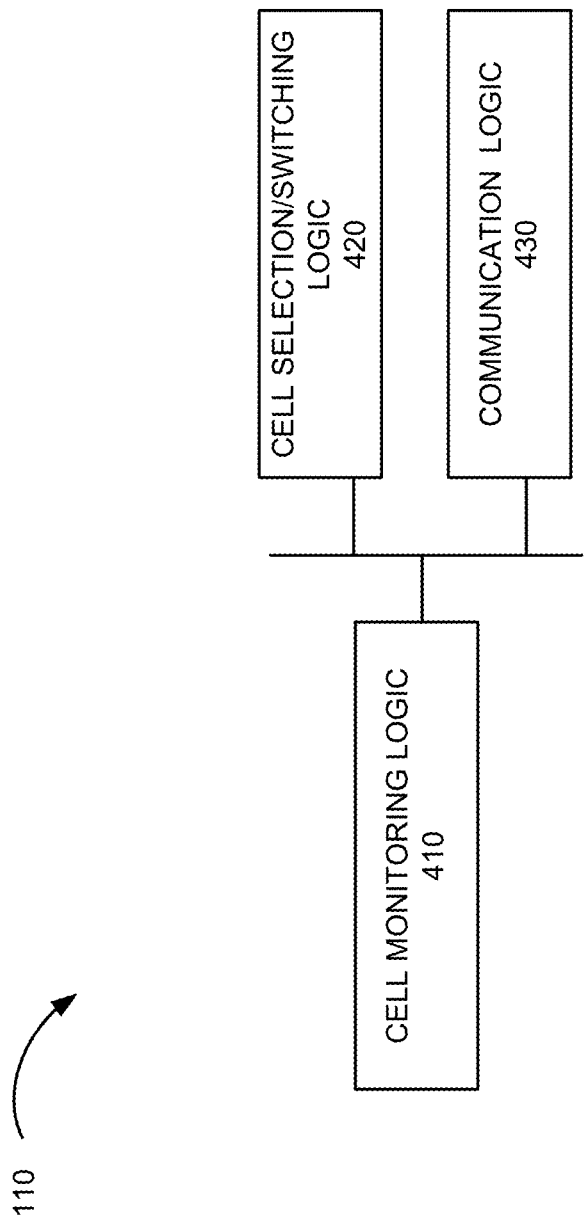
FIG. 4 illustrates an exemplary configuration of logic components implemented in the user equipment device of FIG. 1.

FIG. 4 is an exemplary functional block diagram of components implemented in UE 110. In an exemplary implementation, all or some of the components illustrated in FIG. 4 may be implemented by processor 320 executing software instructions stored in memory 330. In other implementations, all or some of the components illustrated in FIG. 4 may be implemented in hardware or a combination of hardware, firmware and software used to perform the functionality described below.

UE 110 may include cell monitoring logic 410, cell selection/switching logic 420 and communication logic 430. In alternative implementations, these components or a portion of these components may be located externally with respect to UE 110.

Cell monitoring logic 410 may include logic to measure and/or monitor the signal strengths of detected signals from associated cells. For example, UE 110 in its current location illustrated in FIG. 2 may measure the strength of communication signals from wireless stations 120 associated with each of cells 210-240.

Cell selection/switching logic 420 may include logic to select, based on information such as detected signal strengths from cell monitoring logic 410, a cell, such as an anchor cell (e.g., MCG) or non-anchor cell (e.g., SCG) in environment 100. For example, UE 110 illustrated in FIG. 2 may establish communications with a wireless station associated with cell 210 (e.g., an anchor cell in this example) to facilitate communications via a 5G NR cell, such as cell 230. For example, selecting a cell that corresponds to an anchor cell or MCG may allow that anchor cell or MCG to setup dual connectivity (DC) to gNode Bs (or SCGs) or other device associated with communications via 5G NR cell 230 and/or 5G NR cell 240 when UE 110 is located within an area defined by 5G NR cell 230 and/or 5G NR cell 240, as described in detail below. In one implementation, cell selection/switching logic 420 may include logic for on-demand switching of connectivity from a current 5G SCG to another 5G SCG anchored by a same non-5G MCG (or a same 5G MCG) using layer 2 signaling, for example, a MAC CE associated with UE 110. In this manner, 5G (e.g., mmWave) connectivity may be maintained, following UE 110's movement between 5G SCGs or UE 110's experiencing signal degradation (e.g., obstruction) within a 5G SCG at the air interface, without disruption, as described in detail below.

Communication logic 430 may include logic to communicate with elements in environment 100, directly or indirectly. For example, communication logic 430 may, based on instructions from cell selection/switching logic 420, transmit and receive communications associated with establishing a radio resource control (RRC) connection with the appropriate wireless stations 120 in environment 100, such as eNB 120-1' associated with an MCG. Communication logic 430 may, based on instructions from cell selection/switching logic 420, also transmit and receive communications associated with on-demand switching to establish a connection with a gNB 120-2" associated with an SCG.

Although FIG. 4 shows exemplary components of UE 110, in other implementations, UE 110 may include fewer components, different components, differently arranged components, or additional components than depicted in FIG. 4. In addition, functions described as being performed by one of the components in FIG. 4 may alternatively be performed by another one or more of the components of UE 110.

Figure 5:
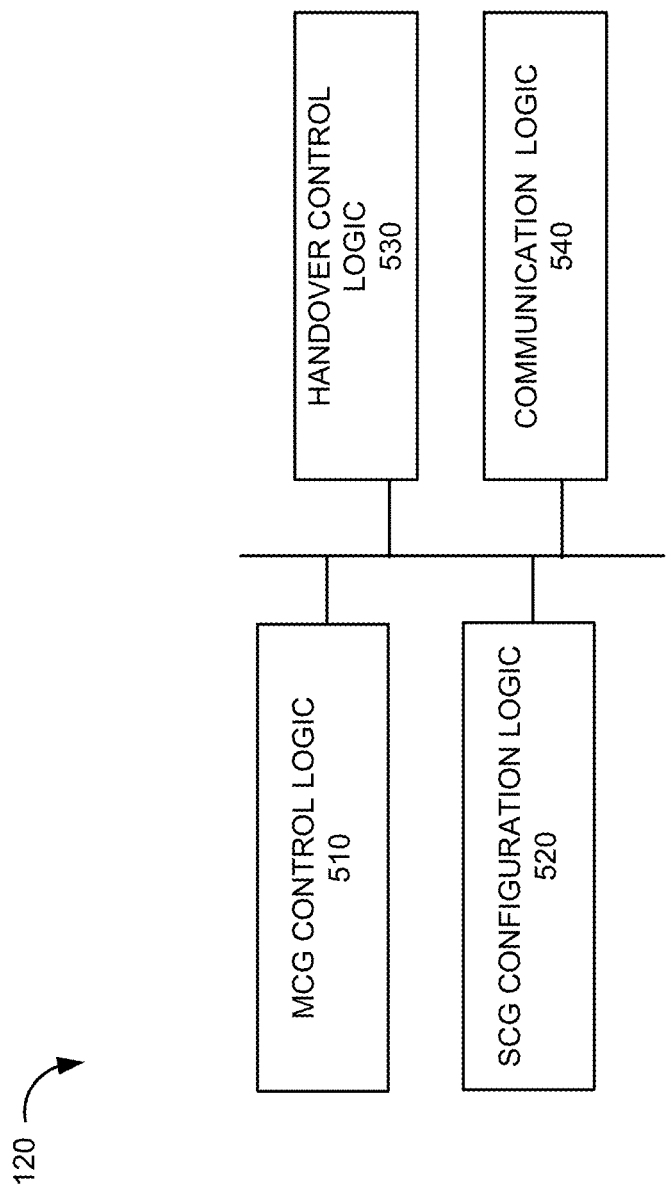
FIG. 5 illustrates an exemplary configuration of logic components implemented in a wireless station of FIG. 1.

FIG. 5 is an exemplary functional block diagram of components implemented in wireless station 120. In an exemplary implementation, all or some of the components illustrated in FIG. 5 may be implemented by processor 320 executing software instructions stored in memory 330. In other implementations, all or some of the components illustrated in FIG. 5 may be implemented in hardware or a combination of hardware, firmware and/or software used to perform the functionality described below.

Wireless station 120 may include MCG control logic 510, SCG configuration logic 520, handover control logic 530 and communication logic 540. In alternative implementations, these components or a portion of these components may be located externally with respect to wireless station 120.

MCG control logic 510 may include logic to generate and transmit/receive control signaling to/from UE 110, which may be an EN-DC device or an NR-DC device communicating via a 5G SCG cell. For example, MCG control logic 510 may provide anchoring operations and control plane signaling for each 5G NR SCG in an SCG-set assigned to MCG (anchor cell).

SCG configuration logic 520 may include logic to configure a set of 5G NR cells anchored by a non-5G MCG or a 5G MCG (e.g., 210). For example, SCG configuration logic 520 may use RRC to configure multiple SCGs having coverage areas that at least partially overlap with a coverage area of the MCG.

RRC may correspond to a protocol that handles signaling between UE 110 and RAN 130. RRC states (e.g., idle, connected, etc.) may be handled by the control plane which includes an RRC layer. During RRC idle mode, UE 110 may camp on an MCG after MCG selection or reselection takes place, where factors such as, for example, radio link quality, cell status, and radio access technology may be considered. As used herein, "camping" on a selected MCG refers to UE 110 maintaining data exchanges with core network 140 within the confines of the selected MCG (e.g., associated with one of eNBs 120-1). A cell or MCG may include a coverage area served by an eNB (e.g., one of eNBs 120-1) using a particular frequency band. Thus, in some cases, an MCG and eNB 120-1 servicing the MCG may be referred to interchangeably. UE 110 may also monitor a paging channel to detect incoming calls and acquire system information. In the idle mode, the control plane protocols include MCG selection and reselection procedures. During RRC connected mode, UE 110 may provide MCG 210 with downlink channel quality and neighbor cell information so MCG 210 may assist UE 110 to setup the most suitable SCGs for dual connectivity (DC). For example, UE 110 may measure parameters (e.g., radio link signal strength) associated with a current set of SCGs to which UE 110 has dual connectivity, as well as the neighboring SCGs. The key parameters (such as radio link signal strength) of the SCG may be measured for the intra-frequency and inter-frequency neighboring SCGs. The measurements may be tracked and uploaded to the RRC layer, which makes control decisions on which SCGs UE 110 is configured for DC. Accordingly, SCG fast selection may be based on a number of levels of criteria, which may include absolute priority, radio link quality, and/or SCG accessibility.

Handover control logic 530, using control information from MCG control logic 510 and/or configuration information from SCG configuration logic 520, may include logic to facilitate a handover associated with communications from one cell to another cell. For example, handover control logic 530 may handover communications from one non-5G (e.g., LTE cell) to another non-5G MCG. Handover control logic 530 may also handover communications from a non-5G MCG (e.g., LTE cell) to a 5G NR SCG (e.g., mmWave cell). Handover control logic 530 may also handover communications from a 5G NR SCG (e.g., mmWave cell) to a 5G NR SCG. For example, if UE 110 is located in an area supporting 5G communications, such as within cell 230 illustrated in FIG. 2, handover control logic 530 may transition or handoff communications associated with MCG 210 to wireless station 120-2' in the 5G network. The term "handover" as used herein (also referred to herein as "handoff") should be broadly construed as the process of transferring an ongoing data session from one cell or channel to another cell or channel while the data session is occurring and without the loss or interruption of service. In one implementation, in a standalone (SA) NR-NR DC architecture, handover control logic 530 may handover communications from a 5G MCG (e.g., sub-6) to a 5G NR SCG (e.g., mmWave cell).

Communication logic 540, using information from MCG control logic 510, SCG configuration logic 520, and/or handover control logic 530, may include logic to communicate with elements in environment 100 directly or indirectly. For example, communication logic 540 may communicate with UE 110 to establish an RRC connection. Communication logic 540 may also initiate communications with another cell, such as another LTE MCG and/or a 5G SCG to allow an EN-DC UE 110 to communicate via a 5G network, as described in detail below.

Figure 6:
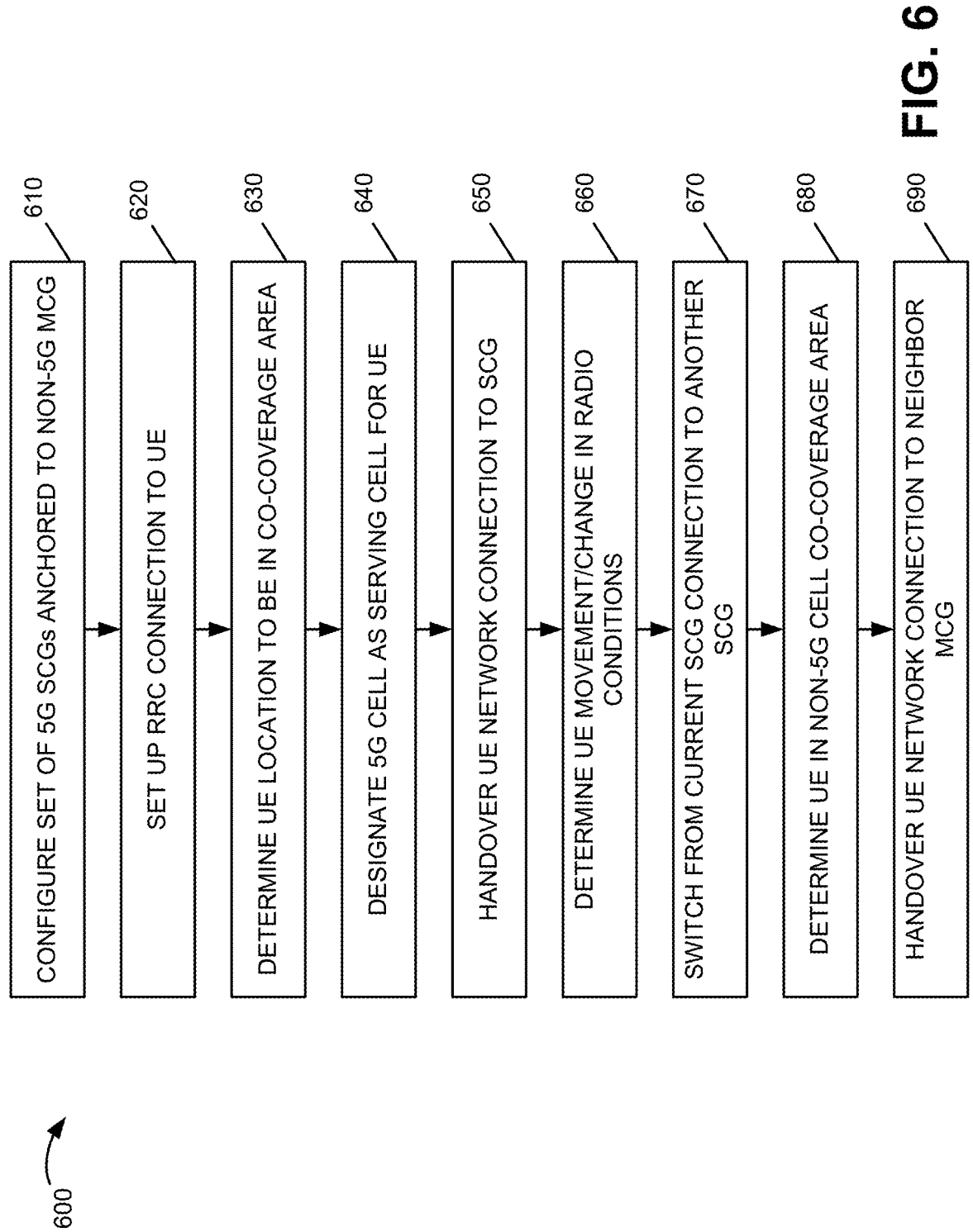
FIG. 6 is a flow diagram illustrating processing by various components in the environment of FIG. 1 in accordance with an exemplary implementation.

FIG. 6 is flow diagram illustrating exemplary processing 600 associated with UE 110 connecting to wireless station 120 via a non-5G MCG (e.g., RAN 130-1) and establishing connections with a 5G NR SCG (e.g., RAN 130-2). Processing may begin with non-5G wireless station 120-1' identifying and configuring multiple 5G wireless stations 120-2' and 120-2" and their associated 5G cells to form a set of SCGs anchored to an MCG 210 (block 610). For example, wireless station 120-1' may use RRC (e.g., layer 3) signaling to setup some or all 5G cells, having overlapping (or co-coverage) service areas with non-5G cell 210, as configured 5G SCGs anchored to MCG 210.

In this example, assume that eNB1 120-1' associated with cell 210 receives an RRC connection request from UE 110, which may be made based on information from cell selection/switching logic 420. Processing 600 may further include wireless station 120-1' setting up an RRC connection with UE 110 in response to the request (block 620). Wireless station 120-1' may determine that a current location of UE 110 corresponds to the location of co-coverage areas of MCG 210 anchor and the set of SCGs 230 and 240, for both LTE and 5G coverage availability (block 630). Wireless station 120-1' may add or designate SCG 230 and SCG 240 associated with gNB1 120-2' and gNB2 120-2" as the configured 5G SCGs for UE 110 (block 640). Wireless station 120-1 may then designate gNB2 120-2" associated with SCG 230 as the serving cell for UE 110. In this scenario, eNB1 120-1' may then initiate a handover of network communications associated with UE 110 to gNB1 120-2' associated with SCG 230 (block 650). ENB1 120-1' may be configured to facilitate a connection from UE 110 to an anchor cell regardless of whether UE 110 is in an idle state or a connected state. After the handover is completed, UE 110 may communicate with other devices in environment 100 in accordance with a 5G protocol. In some implementations, eNB1 120-1' may provide all control plane signaling with UE 110, while gNB1 120-2' may provide data plane communications for UE 110. In one implementation, MCG 210 operates in a sub-6 frequency band, and SCG 230 operates in an mmWave frequency band. Other frequency bands are possible in other implementations.

Assume that a change is detected in the radio conditions at the air interface between UE 110 and SCG 230 (block 660), for example, when UE 110 moves toward a coverage area boundary and/or a large vehicle is positioned between UE 110 and gNB1 120-2'. In this example, UE 110 may determine another SCG's signal strength. For example, cell monitoring logic 410 of UE 110 may measure the signal strength of SCG 240. Cell monitoring logic 410 may trigger a measurement report, such as signal strength measurement report, when the signal strength of gNB2 120-2" associated with the neighbor cell is increasing and/or becomes greater than a threshold level.

If the currently connected gNB1 120-2' determines that the signal strength of SCG 240 is greater than the threshold level, gNB1 120-2' may then initiate the handoff of the connection with UE 110 to gNB2 120-2" (block 670). For example, UE 110 may perform fast SCG selection using a MAC control element (CE) to perform a layer 2 handoff of communications with UE 110 to gNB2 120-2", which in this example, is one of multiple SCGs anchored to MCG 210. Wireless station 120-1 may then designate gNB2 120-2" associated with SCG 240 as the serving cell for UE 110. In this manner, UE 110 may experience no interruption in its mmWave connection when signal strength (or other parameter) associated with a current SG cell is reduced.

eNB1 120-1' may also or alternatively determine that UE 110 is moving toward a boundary of MCG 210 and is within a overlapped boundary of non-5G cell 220 associated with eNB2 120-1", that is in a co-coverage area (block 680). Based on this information, eNB1 120-1' may initiate a handover of communications (e.g., a transfer of connection configurations) with UE 110 to eNB2 120-1" (block 690), so that MCG 220 becomes an anchor cell to SCG 230 and SCG 240. After which, if the signal strength of SCG 240 drops below a threshold level, the connection with UE 110 may be released and a non-5G connection established between UE 110 and MCG 220.

Implementations described herein provide for 5G service continuity for an EN-DC device by configuring a set of SCGs to be anchored to a non-5G MCG, where only one of the SCGs is active at a time for providing mmWave connectivity to a UE. When the current 5G connectivity degrades due to UE movement or physical obstructions, the UE's MAC CE may initiate an on-demand switch (layer 2) to another SCG in the set of SCGs anchored to the MCG. In this manner, handover is made between SCGs without the need to tear down and re-establish an SCG, and thus eliminating disruption to continuous mmWave service. Moreover, this results in a comparatively lower signaling overhead than conventional handovers involving signaling-intensive RRC operations.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to an EN-DC device communicating via both a 4G network and a 5G network based on network availability. In other implementations, anchor management may be provided in a manner consistent with the description above to allow a DC user device to communicate via other types of networks to take advantage of newer and/or more advanced networks when such networks are provisioned by a service provider. One example, is NR-DC, in which the MCG is associated with a sub-6 gNB and the SCG is associated with a mmWave gNB Further, while series of acts have been described with respect to FIG. 6, the order of the acts and signal flows may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining, by a network device anchored to a first anchor master cell group (MCG) associated with multiple Fifth Generation (5G) secondary cell groups (SCGs), that a multi-radio dual connectivity (MR-DC) user equipment (UE) device has a wireless connection to a first 5G wireless station via a first 5G SCG, wherein a second 5G SCG is associated with a second 5G wireless station;
    switching, by the network device, the wireless connection from the first 5G SCG to the second 5G SCG; and
    transitioning, by the network and based on the switching, the first 5G SCG and the second 5G SCG from the first anchor MCG to a second anchor MCG.

2. The method of claim 1, wherein at least one of the switching or the transitioning is performed without interruption of the wireless connection or an application service accessed via the wireless connection.

3. The method of claim 1, wherein the switching is based on the MR-DC UE device being located in an area that is associated with the first anchor MCG and the second anchor MCG.

4. The method of claim 1, wherein the first 5G wireless station and the second 5G wireless station comprise next generation Node Bs (gNBs),
    wherein the first wireless station comprises one of an evolved Node B or a gNB, and
    wherein the first anchor MCG comprises one of a Long-Term Evolution (LTE) radio access network (RAN) or a 5G New Radio (NR) RAN.

5. The method of claim 4, wherein the MR-DC UE device comprises one of:
    an Evolved Universal Terrestrial Radio Access (E-UTRA) 5G New Radio (NR) Dual Connectivity (EN-DC) device, or
    a 5G NR Dual Connectivity (NR-DC) device.

6. The method of claim 1, further comprising:
    determining that a quality level of the wireless connection to the first anchor MCG has degraded below a threshold level; and
    releasing the first anchor MCG based on the degraded quality level of the wireless connection.

7. The method of claim 6, further comprising:
    establishing the wireless connection to a second wireless station associated with the second anchor MCG; and
    anchoring the first 5G SCG and the second 5G SCG to the second anchor MCG without interrupting the wireless connection.

8. A system comprising:
    a network device, anchored to a first anchor master cell group (MCG) associated with multiple Fifth Generation (5G) secondary cell groups (SCGs), configured to:
        determine that a multi-radio dual connectivity (MR-DC) user equipment (UE) device has a wireless connection to a first 5G wireless station via a first 5G SCG, wherein a second 5G SCG is associated with a second 5G wireless station;
        switch the wireless connection from the first 5G SCG to the second 5G SCG; and
        transition, based on the switching, the first 5G SCG and the second 5G SCG from the first anchor MCG to a second anchor MCG.

9. The system of claim 8, wherein at least one of the switching or the transitioning is performed without interruption of the wireless connection or an application service accessed via the wireless connection.

10. The system of claim 8, wherein the switching is based on the MR-DC UE device being located in an area that is associated with the first anchor MCG and the second anchor MCG.

11. The system of claim 8, wherein the first 5G wireless station and the 5G second wireless station comprise next generation Node Bs (gNBs),
    wherein the first wireless station comprises one of an evolved Node B or a gNB, and
    wherein the first anchor MCG comprises one of a Long-Term Evolution (LTE) radio access network (RAN) or a 5G New Radio (NR) RAN.

12. The system of claim 8, wherein the MR-DC UE device comprises one of:
    an Evolved Universal Terrestrial Radio Access (E-UTRA) 5G New Radio (NR) Dual Connectivity (EN-DC) device, or
    a 5G NR Dual Connectivity (NR-DC) device.

13. The system of claim 8, wherein the first wireless station is further configured to:
    determine that a quality level of the wireless connection to the first anchor MCG has degraded below a threshold level; and
    release the first anchor MCG based on the degraded quality level of the wireless connection.

14. The system of claim 13, wherein the first wireless station is further configured to:
    establish the wireless connection to a second wireless station associated with the second anchor MCG; and
    anchor the first 5G SCG and the second 5G SCG to the second anchor MCG without interrupting the wireless connection.

15. A non-transitory computer-readable medium for storing instructions which, when executed by a processor associated with a network device anchored to a first anchor master cell group (MCG) associated with multiple Fifth Generation (5G) secondary cell groups (SCGs), cause the processor to:
  determine that a multi-radio dual connectivity (MR-DC) user equipment (UE) device has a wireless connection to a first 5G wireless station via a first 5G SCG, wherein a second 5G SCG is associated with a second 5G wireless station;
  switch the wireless connection from the first 5G SCG to the second 5G SCG; and
  transition, based on the switching, the first 5G SCG and the second 5G SCG from the first anchor MCG to a second anchor MCG.

16. The non-transitory computer-readable medium of claim 15, wherein at least one of the switching or the transitioning is performed without interruption of the wireless connection or an application service accessed via the wireless connection.

17. The non-transitory computer-readable medium of claim 15, wherein the switching is based on the MR-DC UE device being located in an area that is associated with the first anchor MCG and the second anchor MCG.

18. The non-transitory computer-readable medium of claim 15, wherein the first 5G wireless station and the second 5G wireless station comprise next generation Node Bs (gNBs),
  wherein the first wireless station comprises one of an evolved Node B or a gNB, and
  wherein the first anchor MCG comprises one of a Long-Term Evolution (LTE) radio access network (RAN) or a 5G New Radio (NR) RAN.

19. The non-transitory computer-readable medium of claim 15, wherein the MR-DC UE device comprises one of:
  an Evolved Universal Terrestrial Radio Access (E-UTRA) 5G New Radio (NR) Dual Connectivity (EN-DC) device, or
  a 5G NR Dual Connectivity (NR-DC) device.

20. The non-transitory computer-readable medium of claim 15, wherein the instructions further cause the processor to:
  determine that a quality level of the wireless connection to the first anchor MCG has degraded below a threshold level;
  release the first anchor MCG based on the degraded quality level of the wireless connection;
  establish a wireless connection to a second wireless station associated with the second anchor MCG; and
  anchor the first 5G SCG and the second 5G SCG to the second anchor MCG without interrupting the wireless connection.

* * * * *